United States Patent [19]

Beres et al.

[11] 4,035,119
[45] July 12, 1977

[54] TIRE MOLD

[75] Inventors: Arthur W. Beres, Akron; Helmut Dernbach, Cuyahoga Falls; Richard A. Raymondi, Canton, all of Ohio

[73] Assignee: The Goodyear Tire & Rubber Company, Akron, Ohio

[21] Appl. No.: 715,755

[22] Filed: Aug. 18, 1976

[51] Int. Cl.$^2$ .......................................... B29H 5/02
[52] U.S. Cl. .................................. 425/46; 425/20; 249/170
[58] Field of Search ............. 425/17, 20, 25, 28 R, 425/28 D, 32, 35, 39, 46, 47; 249/170, 171

[56] References Cited

U.S. PATENT DOCUMENTS

| | | | |
|---|---|---|---|
| 1,429,831 | 9/1922 | Barney | 425/20 |
| 2,297,017 | 9/1942 | Overman | 425/46 |
| 2,333,588 | 1/1943 | Schaevitz | 425/20 |
| 2,372,217 | 3/1945 | MacMillan | 425/20 |

*Primary Examiner*—J. Howard Flint, Jr.

*Attorney, Agent, or Firm*—F. W. Brunner; R. S. Washburn

[57] ABSTRACT

A tire mold having two "half" molds each including a side wall and a tread molding portion and a center ring having a tread molding portion for molding one third or less of the total width of the tire tread. The center ring is divided into eight sections each hinged to one of the half molds to swing open and outward of interfering portions of the tread pattern, being opened solely by the movement of the tire as it is lifted from the mold. No auxiliary mechanism for driving the sections is used or needed, and the mold is opened and closed in the same manner as the usual two piece tire mold. The foregoing abstract is not to be taken as limiting the invention of this application, and in order to understand the full nature and extent of the technical disclosure of this application, reference must be made to the accompanying drawing and the following detailed description.

3 Claims, 3 Drawing Figures

TIRE MOLD

The present invention relates to tire molds and particularly to a tire mold for a tire having deep tread grooves extending from one shoulder across the tread centerline but not fully to the other shoulder as well as for a tire having tread grooves extending at acute angles across the tread centerline.

Broadly, the invention provides a tire mold comprising an annular top part and an annular bottom part each including a sidewall molding portion and an annularly integral tread molding portion, the tread molding portion terminating at a plane face normal to the mold axis, spaced from the mid-circumferential plane of the mold; and having tread molding pattern of projections and depressions for molding at least one-third of the width of the tread of a tire to be molded in the mold; one said mold part having a plurality of hinge lugs spaced angularly about the mold axis and affixed on the periphery of the mold part adjacent said face thereof; and a center ring having an upper and a lower plane surface and a tread molding pattern for molding not more than one-third of the width of the tread of a tire to be molded in the mold, said ring comprising a plurality of arcuate sections each swingably connected respectively to a pair of said hinge lugs; the plane face of each said part being in coplanar contact with the respectively associated plane surface of said ring while the mold is closed.

A preferred embodiment of the invention is described hereinbelow with reference to the attached drawings, wherein.

Figure 1:
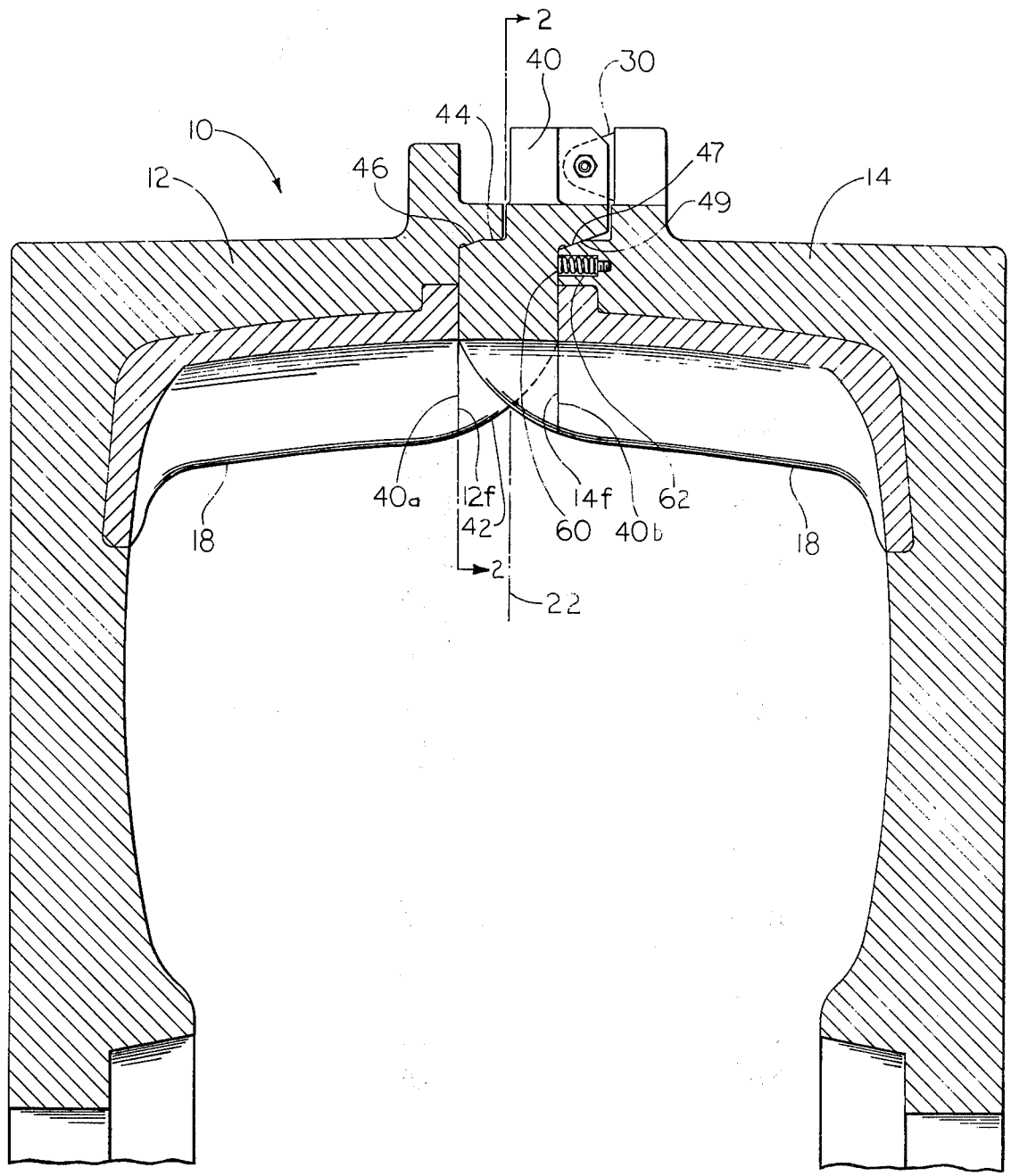
FIG. 1 is a partial elevation, in cross-section, of a tire mold in accordance with the invention.
Figure 2:
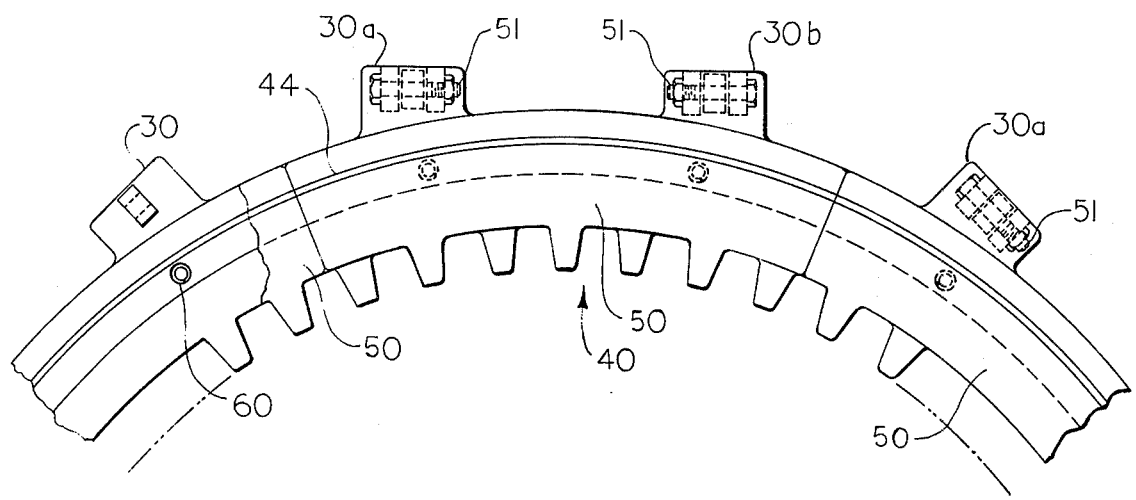
FIG. 2 is a plan view in section of a portion of the tire mold of FIG. 1 taken at the line 2—2 of FIG. 1.
Figure 3:
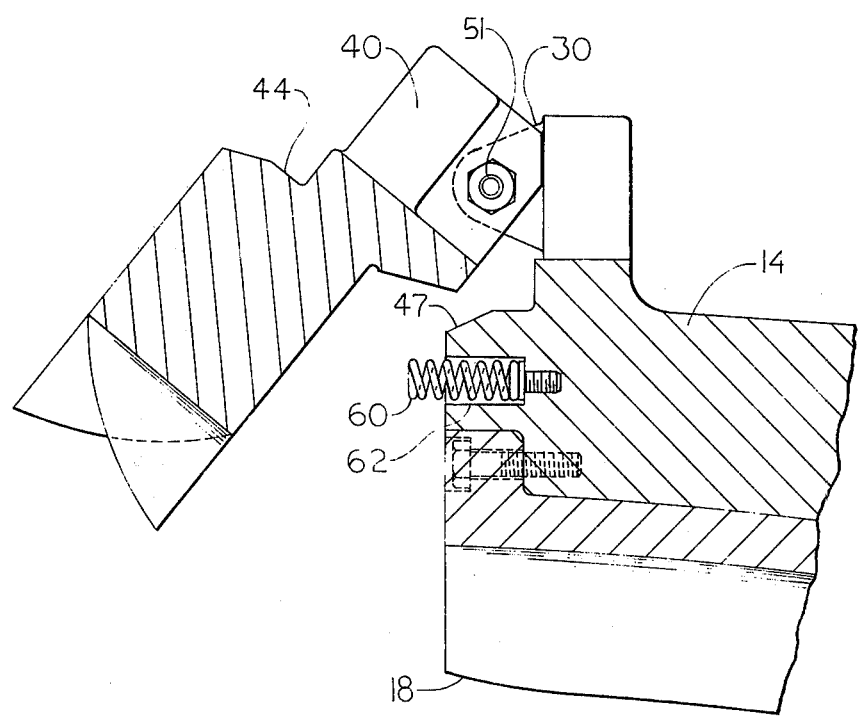
FIG. 3 is a sectional elevation of a portion of the tire mold in FIG. 1.

Referring to FIG. 1: a tire mold 10 in accordance with the invention comprises an upper or top part 12 and a lower or bottom part 14 each of which includes an integral annular sidewall member 16 and an integral tread molding portion 18 including a tread molding pattern of projections and depressions. The top part and the bottom part of the mold each have tread molding portions for molding at least one-third of the width of a tire to be molded in the mold. Each part mold and its tread molding portion terminate, respectively, at a plane face 12f, 14f normal to the mold axis 20 and spaced from the mid-circumferential plane 22 of the mold. The bottom part mold has a plurality of hinge lugs 30, FIG. 2, arranged in pairs 30a, 30b spaced angularly about the mold axis and affixed on the periphery of the mold part adjacent the plane face. As with conventional two-piece molds, the mold part 12 or 14 may be termed a "mold half".

In accordance with the invention, the mold includes a center ring 40 which is also provided with a tread molding portion 42 having a tread molding pattern for molding not more than one-third of the width of the tread of the tire to be molded in the mold. In the mold 10, the center ring 40 provides about 4 inches of the width of the tire tread which is about 26 inches wide. The center ring is disposed between the top 12 and bottom 14 part molds and the plane faces 12f, 14f of each mold part, when the mold 10 is closed, are in coplanar contact with the respective upper and lower plane surfaces 40a, 40b of the center ring.

The center ring 40 is provided with a cylindrical pilot 44 which cooperates with a counterbore or register 46 in the upper mold part 12 to align the upper mold part and the center ring coaxially. The lower mold part 14 is provided with a pilot 47 which, in like manner, cooperates with a conical register 49 formed in the center ring 40 to align the center ring and the bottom part 14 coaxially of each other.

The center ring 40 comprises a plurality, eight in the tire mold 10, of arcuate sections 50 each of which is swingably connected to the hinge lugs 30, each individual section being connected by the hinge pins 51 with an associated pair 30a, 30b of the hinge lugs. Each of the sections 50 of the center ring is free to swing about its respective hinge pin, being lifted from the bottom mold part as the tire molded therein is lifted from the mold.

Spring means in the form of a plurality of compression springs 60 are disposed in spring seats 62 formed in the mold bottom half 14 to oppose the weight of the respective sections thereby biasing the sections toward a mold open position. The springs also serve to cushion the return of the respective sections to their closed position.

A notable feature is the fact that the sections 50 of the center ring of the tire mold 10 are moved toward their open positions simply by lifting the tire from the mold and to their closed positions by their own weight. Thus, no driving mechanism is required to operate the center ring sections, and a conventional press or clamp having a single movable platen can be used.

The tire mold is of particular advantage for tires wherein the tread design grooves change direction at or near the mid-circumferential plane of the tire and particularly in tire tread designs with deep non-skid grooves in which the grooves extend from one shoulder beyond the tread centerline but end inward of the other shoulder of the tire.

The tire mold according to the invention thus provides both the advantages associated with molds having sequential tread rings, and the advantages associated with two-piece molds.

While certain representative embodiments and details have been shown for the purpose of illustrating the invention, it will be apparent to those skilled in the art that various changes and modifications may be made therein without departing from the spirit or scope of the invention.

We claim:

1. A tire mold comprising an annular top part and an annular bottom part each including a sidewall molding portion and an annularly integral tread molding portion, the tread molding portion terminating at a plane face normal to the mold axis, spaced from the mid-circumferential plane of the mold and having tread molding pattern of projections and depressions for molding at least one-third of the width of the tread of a tire to be molded in the mold; one said mold part having a plurality of hinge lugs spaced angularly about the mold axis and affixed on the periphery of the mold part adjacent said face thereof; and a center ring having an upper and a lower plane surface and a tread molding pattern for molding not more than one-third of the width of the tread of a tire to be molded in the mold, said ring comprising a plurality of arcuate sections each swingably connected respectively to a pair of said hinge lugs; the plane face of each said part being in coplanar contact with the respectively associated plane surface of said ring while the mold is closed.

2. A tire mold as claimed in claim 1, said ring having a cylindrical pilot and a conical register, said pilot and register extending coaxially of the mold, one said half having a cylindrical pilot cooperable with said conical register, the other said half having a conical register cooperable with said pilot to align said ring and each said half coaxially of each other when the mold is closed.

3. A tire mold as claimed in claim 1, including spring means biasing said sections to oppose the weight thereof.

* * * * *